US005670079A

United States Patent [19]

Lunger et al.

[11] Patent Number: 5,670,079
[45] Date of Patent: Sep. 23, 1997

[54] AZEOTROPIC AND AZEOTROPE-LIKE COMPOSITIONS OF A HYDROFLUOROCARBON AND A HYDROCARBON

[75] Inventors: Brooks Shawn Lunger, Newark; Glenn Scott Shealy, Hockessin, both of Del.

[73] Assignee: E. I. Du Pont de Nemours and Company, Wilmington, Del.

[21] Appl. No.: 439,064

[22] Filed: May 8, 1995

Related U.S. Application Data

[60] Division of Ser. No. 176,622, Jan. 3, 1994, Pat. No. 5,458,798, which is a continuation-in-part of Ser. No. 14,293, Feb. 5, 1993, abandoned.

[51] Int. Cl.$^6$ .............. C09K 5/04; C11D 7/02; C11D 7/24; C11D 7/30
[52] U.S. Cl. .............. 252/67; 510/408; 510/177; 62/114; 62/324.1
[58] Field of Search .............. 252/67, 172, DIG. 9; 62/114, 324.1; 510/408, 410, 412, 415, 177

[56] References Cited

U.S. PATENT DOCUMENTS

| | | | |
|---|---|---|---|
| 4,138,855 | 2/1979 | Jahan et al. | 62/112 |
| 4,198,313 | 4/1980 | Bargigia et al. | 252/305 |
| 4,272,960 | 6/1981 | Wahl, III | 60/641 |
| 4,482,465 | 11/1984 | Gray | 252/67 |
| 4,810,403 | 3/1989 | Bivens et al. | 252/67 |
| 4,941,986 | 7/1990 | Jolly | 252/51.5 R |
| 4,944,890 | 7/1990 | Deeb et al. | 252/54 |
| 4,954,289 | 9/1990 | Bartlett et al. | 252/305 |
| 5,006,568 | 4/1991 | Fukazawa et al. | 521/98 |
| 5,026,497 | 6/1991 | Merchant | 252/171 |
| 5,080,823 | 1/1992 | Arnaud et al. | 252/172 |
| 5,108,637 | 4/1992 | Pearson | 252/67 |
| 5,182,040 | 1/1993 | Bartlett et al. | 252/67 |
| 5,194,325 | 3/1993 | Jones | 428/318.6 |
| 5,198,475 | 3/1993 | Kimura et al. | 52/164 |
| 5,234,613 | 8/1993 | Shiflett | 252/67 |
| 5,278,196 | 1/1994 | Robin et al. | 521/98 |
| 5,304,320 | 4/1994 | Barthelemy et al. | 252/67 |
| 5,351,499 | 10/1994 | Takemasa | 252/67 |
| 5,403,504 | 4/1995 | Bivens et al. | 252/67 |
| 5,458,798 | 10/1995 | Lunger et al. | 252/67 |

FOREIGN PATENT DOCUMENTS

| | | |
|---|---|---|
| 0372777 | 6/1990 | European Pat. Off. . |
| 430170 | 6/1991 | European Pat. Off. . |
| 430131 | 6/1991 | European Pat. Off. . |
| 0 537 045 | 4/1993 | European Pat. Off. . |
| 539952 | 5/1993 | European Pat. Off. . |
| 0 552 075 | 7/1993 | European Pat. Off. . |
| 558823 | 9/1993 | European Pat. Off. . |
| 0 565 265 | 10/1993 | European Pat. Off. . |
| 4003272 | 8/1991 | Germany . |
| 63308085 | 12/1988 | Japan . |
| 1079290 | 3/1989 | Japan . |
| 1108291 | 4/1989 | Japan . |
| 1139675 | 6/1989 | Japan . |
| 1139683 | 6/1989 | Japan . |
| 1139678 | 6/1989 | Japan . |
| 1139679 | 6/1989 | Japan . |
| 1319592 | 12/1989 | Japan . |
| 418484 | 1/1992 | Japan . |
| 966107 | 10/1982 | U.S.S.R. ............. 252/67 |
| 748411 | 4/1953 | United Kingdom . |
| 2247462 | 3/1992 | United Kingdom . |
| WO 91/16390 | 10/1991 | WIPO . |
| WO92/01762 | 2/1992 | WIPO . |
| 92/16597 | 10/1992 | WIPO . |

OTHER PUBLICATIONS

Wirths, Michael, et al., "High Pressure Phase Studies on Fluid Binary Mixtures", *Fluid Phase Equilib.*, 21(3), 257–78 (1985) month unknown.

Dahmen et al, *Fluid Phase Equilibria* vol. 87 pp. 295–308, Aug. 1993.

Dewitte et al, *Sci Tech Froid* pp. 109–116, 1992 month not known.

Fluorocarbon Azeotropes KSL–283, Research Disclosure 162 (1977).

Heat transfer with pool boiling of hydrocarbons and halogenated refrigerants at a plain and a high performance finned tube, Gorenflo et al. 1991, Waerme–Stoffuebertrag, 26 (5), 273–81 (Abstract Only).

Chemical Engineers Handbook, Perry et al., pp. 13–36— "Azeotropic Distillation", 5th ed. 1973 no month available. 4,–18,485, Japan, Jan. 1992.

Azeotropy in refrigerant mixtures, Graham Morrison, Thermophysics Division, National Institute of Standards and Technology and Mark McLinden., (date unknown).

J.R. Barber et al., Vapor–Liquid Equilibria And Azeotropic States Of Propane–Perfluorocyclobutane Mixtures, *AIChEJ*. (Jan. 1982), vol. 28(1), p. 138–142 (Abstract Only).

W.R. Parrish, Vapor–Liquid Equilibrium Data For The Propane/—, n–Butane/—, Isobutane/—, And Propylene/Isopropyl Fluoride Systems At 30 And 50 Deg. C., *J. Chem. Eng. data* (Jul. 1982), vol. 27(3), pp. 303–305. (Abstract Only).

*Primary Examiner*—Douglas J. McGinty

[57] ABSTRACT

This invention relates to compositions that include at least one hydrocarbon and at least one fluorinated species. Such compositions may be used as refrigerants, cleaning agents, expansion agents for foams such as polyolefins and polyurethanes, aerosol propellants, heat transfer media, gaseous dielectrics, fire extinguishing agents, power cycle working fluids, polymerization media, particulate removal fluids, carrier fluids, buffing abrasive agents, displacement drying agents, among others.

4 Claims, 12 Drawing Sheets

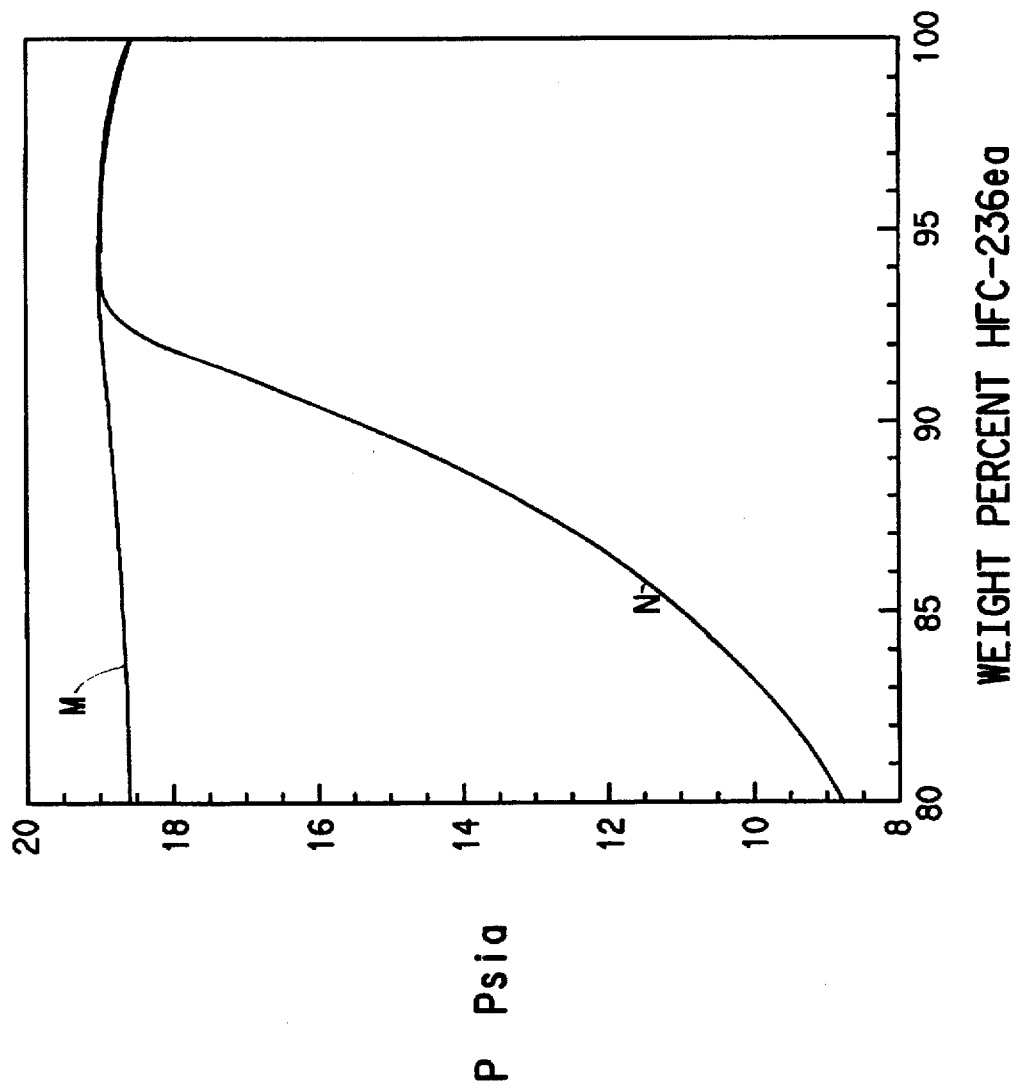

AZEOTROPIC AND AZEOTROPE-LIKE COMPOSITIONS OF A HYDROFLUOROCARBON AND A HYDROCARBON

CROSS-REFERENCE TO RELATED PATENT APPLICATION

This is a division of application Ser. No. 08/176,622, filed Jan. 3, 1994, now U.S. Pat. No. 5,458,798 which is a c-i-p of Ser. No. 08/014,293, filed on Feb. 5, 1993 now abandoned.

FIELD OF THE INVENTION

This invention relates to azeotropic compositions that include fluorine-containing molecules. Such compositions may be used as refrigerants, cleaning agents, expansion agents for polyolefins and polyurethanes, aerosol propellants, heat transfer media, gaseous dielectrics, fire extinguishing agents, power cycle working fluids, polymerization media, particulate removal fluids, carrier fluids, buffing abrasive agents, displacement drying agents, among other applications.

BACKGROUND OF THE INVENTION

Fluorinated hydrocarbons have many uses, one of which is as a refrigerant. Such refrigerants include dichlorodifluoromethane (CFC-12) and chlorodifluoromethane (HCFC-22).

In recent years it has been suggested that certain chlorofluorocarbon (CFC) refrigerants released into the atmosphere may adversely affect the ozone layer. Although this proposition has not yet been completely established, there is a movement toward the control of the use and the production of certain CFCs under an international agreement.

While hydrofluorocarbons (HFCs) may have a zero ozone depletion potential, some HFCs may be flammable and/or subject to governmental regulation. Accordingly, there is a demand for the development of non-flammable refrigerants which have a low ozone depletion potential.

SUMMARY OF THE INVENTION

The present invention relates to compositions that include at least one hydrocarbon and at least one fluorine-containing molecule such as an HCFC and/or HFC. Such compositions may be used as refrigerants, cleaning agents, expansion agents for foams such as polyolefins and polyurethanes, aerosol propellants, heat transfer media, gaseous dielectrics, fire extinguishing agents, power cycle working fluids, polymerization media, particulate removal fluids, carrier fluids, buffing abrasive agents, displacement drying agents, among other applications.

One aspect of this invention relates to the discovery that the flammability of certain mixtures containing a hydrocarbon and a fluorinated molecule can be lowered, if not eliminated, by forming an azeotropic or azeotrope-like composition of the fluorine containing molecule and hydrocarbon. The hydrocarbon and fluorine-containing components of the azeotropic or azeotrope-like composition possess atmospheric boiling points which differ by at least about 20° C., and normally by at least about 37° C. In some cases, the compound may include additional fluorinated molecules and/or hydrocarbons which possess boiling points that are similar to their counterparts of the azeotropic composition or mixture, e.g., an additional fluorinated molecule typically possesses a boiling point which is similar (+−10° C.) to the fluorine-containing molecule component of the azeotropic composition. Accordingly, the present invention relates to an azeotropic or azeotrope-like composition of a first component which comprises at least one fluorine-containing molecule and a second component that comprises at least one hydrocarbon.

As discussed on Page 13–36 of "Chemical Engineer's Handbook", Fifth Edition, by Perry and Chilton, azeotropes occur infrequently between compounds whose boiling points differ by more than about 30° C. It was, therefore, a surprising and an unexpected result that the compositions of the instant invention form azeotropic and azeotrope-like compositions.

BRIEF DESCRIPTION OF THE DRAWINGS

FIG. 12 is a graphical representation of the vapor pressure for a 80 to 100 wt. % mixture consisting essentially of HFC-236ea/cyclopentane.

DETAILED DESCRIPTION

Figure 1:
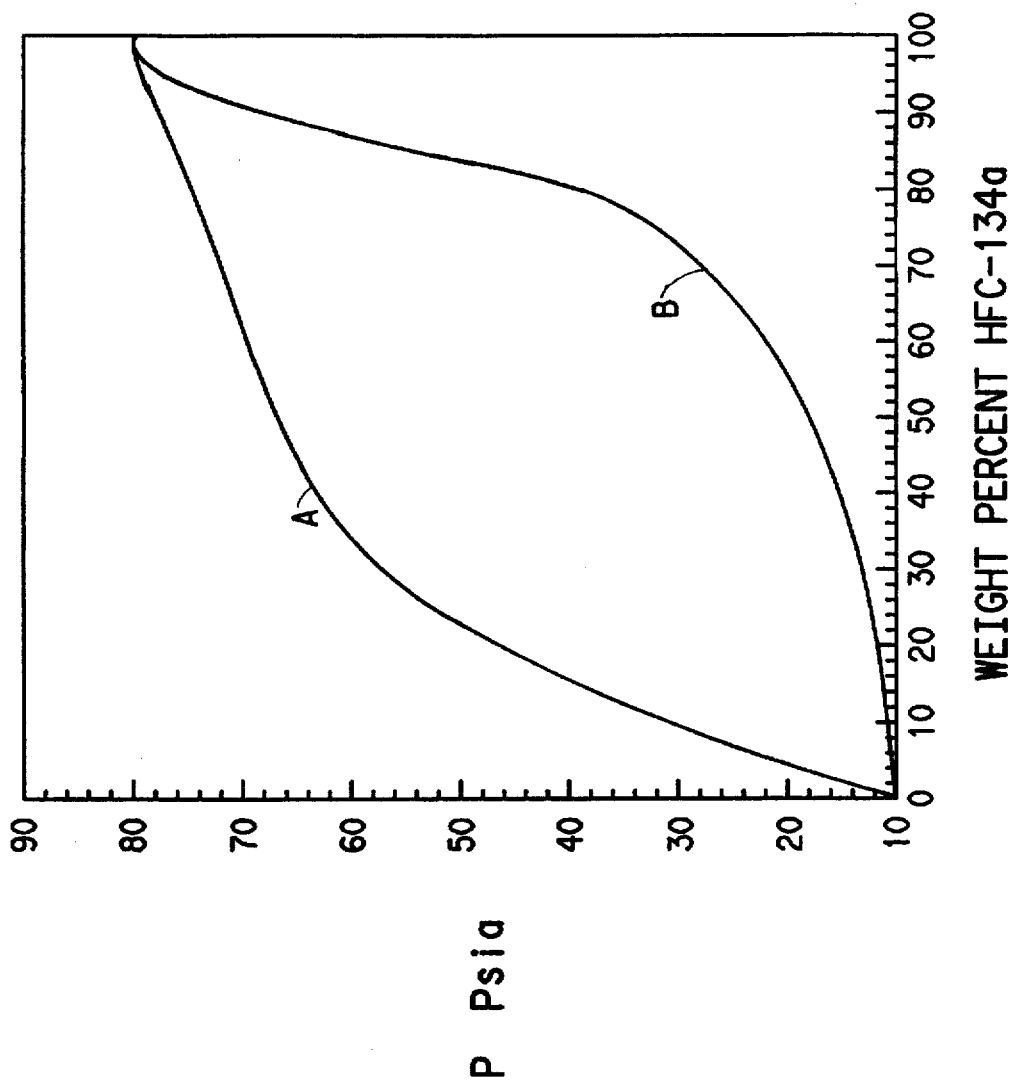
FIG. 1 is a graphical representation of the vapor pressure for a 0 to 100 wt. % mixture consisting essentially of HFC-134a/2-methylbutane.

The present invention relates to azeotropic and azeotrope-like compositions that consist essentially of at least one hydrocarbon and at least one fluorine-containing molecule. A key aspect of the composition relates to the difference between the boiling points of the hydrocarbon and fluorine-containing molecule which are employed to obtain the azeotropic or azeotrope-like composition. In particular, the atmospheric boiling point of the hydrocarbon and fluorine-containing molecule differ by at least about 20° C.; and normally by at least about 37° C., e.g., by about 40° to 50° C. Typically, the boiling point of the hydrocarbon is greater than that of the fluorine-containing molecule component of the azeotropic or azeotrope-like composition. For example, the components of an azeotropic mixture consisting essentially of about 95.5% by weight HFC-134 and 4.5% by weight n-pentane, which occurs at a temperature of about 18.6° C. and a pressure of about 63.3 psia, possess boiling points which differ by at least about 50° C.

The azeotropic or azeotrope-like compositions of the invention normally contain less than about 10%, normally less than about 6% by weight of a hydrocarbon. Depending upon the components of such compositions, the azeotropic or azeotrope-like compositions can exist or form over a wide range of temperatures and pressures, e.g., pressures that range from about 30 to about 450 psia at temperatures from about 0° C. to about 65.6° C.

Notwithstanding the presence of one or more hydrocarbons, the azeotropic or azeotrope-like compositions of the invention can be non-flammable. Further, by being in an azeotropic or azeotropic-like state, should an azeotropic or azeotrope-like vapor composition leak, the hydrocarbon component of the composition avoids becoming fractionated. As a result, the composition of the remaining liquid azeotropic or azeotrope-like composition is substantially unchanged. For example, when using the composition as a refrigerant, notwithstanding the presence of a normally flammable hydrocarbon, the refrigerant can escape substantially without risk of fire, and the escaped refrigerant can be readily replaced by reintroducing the original refrigerant composition into the refrigeration system.

The compositions of the invention may also be used as cleaning agents, expansion agents for foams such as polyolefins and polyurethanes, aerosol propellants, heat transfer media, gaseous dielectrics, fire extinguishing agents, power cycle working fluids, polymerization media, particulate removal fluids, carrier fluids, buffing abrasive agents, displacement drying agents, among many other applications.

Whenever used in the specification and appended claims the terms below are intended to have the following definitions.

By "azeotrope" or "azeotropic" composition is meant a constant boiling liquid admixture of two or more substances that behaves as a single substance. One way to characterize an azeotropic composition or mixture is that the vapor produced by partial evaporation or distillation of the liquid has the same composition as the liquid from which it was evaporated or distilled, e.g., the admixture distills/refluxes without compositional change. Constant boiling compositions are characterized as azeotropic because they exhibit either a maximum or minimum boiling point, as compared with that of the non-azeotropic mixtures of the same components. Another way to characterize an azeotropic composition is the maximum or minimum vapor pressure of the bubble point line.

By "fluorine-containing molecule", is meant to refer to hydrofluorocarbons (HFCs), hydrochlorofluorocarbons (HCFCs), and mixtures thereof.

By "azeotrope-like" composition is meant a constant boiling, or substantially constant boiling, liquid admixture of two or more substances that behaves as a single substance. One way to characterize an azeotrope-like composition is that the vapor produced by partial evaporation or distillation of the liquid has substantially the same composition as the liquid from which it was evaporated or distilled, e.g., the admixture distills/refluxes without substantial compositional change. Another way to characterize an azeotrope-like composition is that area where the bubble point and dew point lines for the composition are substantially overlapping.

Typically, a composition is azeotrope-like if, after about 50 weight percent of the composition is removed such as by evaporation or boiling off, the difference in the original composition and the composition remaining is less than about 10 and normally less than about 2 wt. %.

By "effective amount" is intended to refer to the amount of each component of the inventive compositions which, when combined, results in the formation of an azeotropic or azeotrope-like composition. This definition includes the amounts of each component, which mounts may vary depending on the pressure applied to the composition so long as the azeotropic or azeotrope-like compositions continue to exist at the different pressures, but with possible different boiling points. Effective amount also includes the mounts, such as may be expressed in weight percentages, of each component of the compositions of the instant invention which form azeotropic or azeotrope-like compositions at temperatures or pressures other than as described herein. Therefore, included in this invention are azeotropic or azeotrope-like compositions consisting essentially of effective amounts of at least one hydrocarbon and at least one fluorinated molecule such that after about 50 weight percent of an original composition is evaporated or boiled off to produce a remaining composition, the difference between the original composition and the remaining composition is typically about 10 and normally 2 weight percent or less, when measured in absolute units.

By "Additional fluorinated molecule", "Additional fluorine-containing molecule", or "Additional HFC" is intended to refer to a fluorinated molecule, which is typically present in the azeotropic or azeotrope-like composition as an additive or a modifier, that avoids adversely affecting the properties of the composition. A suitable additional hydrofluorocarbon is characterized by a boiling point which is typically within about +−10° C. of the other fluorinated molecule component of the azeotropic or azeotrope-like mixture.

By "Additional hydrocarbon" is intended to refer to a hydrocarbon, which is typically present in the azeotrope or azeotrope-like composition or mixture as an additive or a modifier, that avoids adversely affecting the properties of the composition. A suitable additional hydrocarbon is characterized by a boiling point which is within about +−15° C. of the hydrocarbon component of the azeotrope or azeotrope-like mixture.

The hydrocarbons and additional hydrocarbons that are included in this invention have 3 to 9 carbon atoms. Typically, suitable hydrocarbons are straight chained, branched saturated, and/or cyclic compounds which have a boiling point less than about 150° C. and a molecular weight less than about 150. Examples of such hydrocarbons comprise at least one member from the group of propane (boiling point=−42.0° C.), isobutane (boiling point=−11.7° C.), n-butane (boiling point 0.50° C.), neopentane or 2,2-dimethylpropane (boiling point 10.0° C.), cyclobutane (boiling point=13.0° C.), isopentane or 2-methylbutane (boiling point=28.0° C.), pentane or n-pentane (boiling point=36.0° C.), cyclopentane (boiling point=49.0° C.), heptane (boiling point 100.2° C.), among others. Each of these hydrocarbons can be prepared or obtained by any suitable method, which is well known to those having ordinary skill in this art.

The fluorine-containing molecules, and additional hydrofluorocarbons (HFCs), which may be combined with, the hydrocarbons in order to form an azeotropic or azeotrope-like composition, comprise at least one member from the group of trifluoroethane (HFC-23, boiling point=−82° C.), difluoromethane (HFC-32, boiling point=−52° C.), pentafluoroethane (HFC-125, boiling point=−48° C.), difluoromethyl trifluoromethyl ether (HFC-125E, boiling point= −350° C.), 1,1,2,2-tetrafluoroethane (HFC-134, boiling point=−20° C.), 1,1,1 2-tetrafluoroethane (HFC-134a, boiling point=−26° C.), fluoromethyl trifluoromethyl ether (HFC-134aE, boiling point=−20° C.), 1,1,1,2,2,3,3-heptafluoropropane (HFC-227ca, boiling point=−17° C.), 1,1,1,2,3,3,3-heptafluoropropane(HFC-227ea boiling point=−18° C.), 1,1,1,3,3,3-hexafluoropropane (HFC-236fa, boiling point=−1° C.), 1,1,2,3,3-hexafluoropropane (HFC-236ea, boiling point=10° C.), 1,1,1,2,2,3-hexafluoropropane (HFC-236cb, boiling point=1° C.), 1,1,2,2-tetrafluoro-1 (difluoromethoxy)ethane (HFC-236caE, boiling point=28° C.), 1,1,1,2-tetrafluoro-2-(difluoromethoxy)ethane (HFC-236eaEbg, boiling point=23° C.), bis-difluoromethylether (HFC-134E, boiling point =0° C.), 2,2-dichloro-1,1,1-trifluoroethane (HCFC-123, boiling point=27.6° C.), 2-chloro-1,1,1,2-tetrafluoroethane (HCFC-124, boiling point=−12° C.), chlorodifluoromethane HCFC-22 (boiling point=40.8° C.), among others. Each of these fluorine-containing molecules can be prepared by or obtained from any suitable method, which is well known in this art.

236CAE (CAS Reg. No. 32778-11-3) has been prepared by fluorination of $CHCl_2OCF_2CHF_2$ (prepared in turn by chlorination of $CH_3OCF_2CHF_2$) using anhydrous hydrogen fluoride with antimony pentachloride catalyst as reported by Terrell, et al. in J. Medicinal Chem., Vol. 15, pp. 604–606 (1972).

236eaEbg (CAS Reg. No. 57041-67-5) has been prepared by chlorination of methoxy acetyl chloride to give the intermediate, $CHCl_2OCHClOCl$, which was isolated and reacted with sulfur tetrafluoride at 150° C. to give the product as disclosed by Halpern and Robin in U.S. Pat. No. 4,888,139.

The following nominal compositions (listed in weight percent and occurring at the temperatures and the pressures listed below) including the difference in atmospheric boiling point of the azeotrope components, are illustrative of compositions consisting essentially of binary azeotropes:

composition includes greater than 0 up to less than about 10% by weight of at least one hydrocarbon; normally less than about 6% hydrocarbon. For example, fluorinated molecules, which possess flame retardant properties such as HFC-125, may form non-flammable azeotropes that include about 4 to about 6% by weight of an effective hydrocarbon.

The following mixtures in weight %, were tested substantially in accordance with American Society of Testing Materials procedure No. ASTM-681–85, and were determined to be non-flammable at about 100° C.

96.7% HFC-134a+3.3% 2-methylbutane
97.4% HFC-134+2.6% 2-methylbutane

It is believed that the mixtures listed above establish the flammability line for mixtures of HFC-134a and 134 with 2-methylbutane (isopentane). In other words, HFC-134a mixtures containing greater than about 3.3 wt. % 2-methylbutane are believed to be flammable.

A further aspect of the invention relates to a binary and/or ternary azeotropic or azeotrope-like mixture which includes at least one material such as an additional hydrocarbon. In some cases, the binary and/or ternary azeotropic or azeotrope-like mixture may also contain at least one additional fluorinated molecules. An additional hydrocarbon and/or a fluorinated molecule may be added to the azeotropic or azeotrope-like mixture for modifying the properties of the azeotrope. For example, adding HFC-134 to a refrigerant consisting essentially of a HFC-134a/2-methylbutane azeotrope-like composition, can improve the safety of the refrigeration system by reducing the risk of fire. In the absence of an additional fluorinated molecule, the vapor released from a liquid HFC-134a/2-methylbutane azeotrope-like composition usually contains slightly less, e.g., about 0.2% by weight less, hydrocarbon in the vapor phase than in the liquid composition. In the case of a refrigerant vapor that was released or has leaked from a refrigeration system into ambient conditions, the concentration of hydrocarbon in the remaining liquid refrigerant composition can gradually increase until becoming flammable. By adding HFC-134,

| Diff. in Boiling Point (C.) | Temp. (C.) | Components | vapor pres. (psia) HFC | HC | azeo comp press HC | range comp. | press. |
|---|---|---|---|---|---|---|---|
| 54 | 18.7 | 134a/2-mb* | 79.5 | 10.6 | 0.5% 79.5 | 94.0–99.9 | 78.5–79.5 |
| 56 | 18.6 | 134/n-C5** | 62.2 | 7.8 | 4.5% 63.3 | 92.0–99.9 | 63.1–62.3 |
| 48 | 18.65 | 134/2-mb* | 62.3 | 10.5 | 6.0% 64.1 | 90.5–99.9 | 63.9–62.4 |
| 37 | 18.8 | 236fa/n-C5 | 31.8 | 7.9 | 7.0% 33.1 | 89.4–99.9 | 33.0–31.9 |
| 40 | 0.0 | 23/propane | 363.7 | 68.3 | 1.8% 363.8 | 91.5–99.9 | 357.1–363.7 |
| 50.8 | 10.0 | 236fa/cyc5+ | 22.6 | 3.18 | 3.5% 22.8 | 91.9–99.9 | 22.6–22.6 |
| 43.3 | 10.0 | 236ea/cyc5 | 18.5 | 3.18 | 5.0% 19.0 | 91.3–99.9 | 18.9–18.5 |

*2-methylbutane
**normal pentane
+cyclopentane

The second column of the above Table lists the temperature at which the azeotropic properties were measured or calculated. The fourth column entitled "vapor pres." lists the vapor pressure of the pure or individual components of the azeotropic mixtures. The fifth column of the above Table indicates the vapor pressure of the azeotropic mixture and the amount of hydrocarbon in the azeotrope. The last column sets forth the range of compositions and pressure at which an azeotrope-like mixture exist.

In some cases, notwithstanding the presence of a hydrocarbon the azeotrope is substantially non-flammable. For best results, a non-flammable azeotropic or azeotrope-like the vapor becomes slightly richer than the liquid in hydrocarbon such that during a vapor refrigerant leak the remaining liquid refrigerant can become depleted in hydrocarbon, thereby maintaining a substantially non-flammable liquid composition in the refrigeration system.

The present invention is capable of providing azeotropic or azeotrope-like mixtures which are substantially constant-boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition, for example, in terms of constant boiling characteristics or tendency not to segregate or fractionate on boiling.

It is possible to characterize, in effect, a constant boiling admixture which may appear under many guises, depending upon the conditions chosen, by any of several criteria:

*The composition can be defined as an azeotrope of hydrocarbon "A", fluorinated molecule "B" (optionally HFC and/or hydrocarbon C and D . . . ), because the term "azeotrope" is at once both definitive and limitative, and requires that effective amounts of A, B (optionally C and D . . . ) for this unique composition of matter which can be a constant boiling composition. It is well known by those skilled in the art, that, at different pressures, the composition of a given azeotrope will vary at least to some degree, and changes in pressure will also change, at least to some degree, the boiling point temperature. Thus, and azeotrope of hydrocarbon "A", hydrofluorocarbon "B" (optionally hydrocarbon and/or HFC C and D . . . ) represents a unique type of relationship but with a variable composition which depends on temperature and/or pressure. Therefore, compositional ranges, rather than fixed compositions, are often used to define azeotropes. The composition can be defined as a particular weight percent relationship or mole percent relationship of hydrocarbon "A", hydrofluorocarbon "B" (optionally hydrocarbon and/or HFC C and D . . . ), while recognizing that such specific values point out only one particular relationship and that in actuality, a series of such relationships, represented by A, B (optionally C and D . . . ) actually exist for a given azeotrope, varied by the influence of pressure. An azeotrope of hydrocarbon "A", fluorinated molecule "B" (optionally hydrocarbon and/or HFC C and D . . . ) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The azeotropic or azeotrope-like compositions of the present invention can be prepared using effective amounts of the components by any convenient method including mixing, combining, among others. For best results, a preferred method is to weigh the desired component amounts, and thereafter combine them in an appropriate container.

The novel compositions of this invention, including the azeotropic or azeotrope-like compositions, may be used to produce refrigeration by condensing the compositions, and thereafter evaporating the condensate in the vicinity of a body to be cooled. The novel compositions may also be used to produce heat by condensing the refrigerant in the vicinity of the body to be heated, and thereafter evaporating the refrigerant. The compositions of the invention may be capable of improving the heat transfer within a refrigeration system, thereby enhancing the operational performance of such a system. Without wishing to be bound by any theory or explanation, it is believed that when an azeotropic or azeotrope-like composition of the invention is employed as a refrigerant the hydrocarbon component of the composition alters, e.g., reduces, the surface tension of the refrigerant thereby improving heat transfer. As used herein "heat transfer" is intended to refer to the rate at which heat is transported across or through a certain area. In the case of an evaporator in a refrigeration system, refrigerant-side heat transfer refers to the rate at which heat is transferred from the outside of a conduit containing refrigerant to the center of the conduit. By increasing heat transfer of the refrigerant, the temperature differential between the outside and center of the conduit is reduced, which in turn increases the efficiency of a cycle in the refrigeration system. Typically, the rate of heat transfer increases with an increasing temperature differential between the outside and center of the conduit. The rate of heat transfer is also dependent upon refrigerant characteristics such as thermal conductivity, heat capacity, surface tension, viscosity, among other characteristics.

The previously described characteristics may permit the azeotropic or azeotrope-like compositions of the invention to be employed as a refrigerant in a system using an oil-free compressor. Such azeotropes may also be useful in refrigeration systems containing microchannel heat exchangers, e.g., channel diameters less than about 0.1 inch, such as described in U.S. Pat. Nos. 4,688,311, 4,998,580, 5,078,209, and 5,157,944; each of which are hereby incorporated by reference.

At least one additive such as lubricants, oils, corrosion inhibitors, stabilizers, dyes, among other appropriate materials, may be added to the novel compositions of the invention for a variety of purposes provided that such materials do not have an adverse influence on the composition for its intended application. Preferred lubricants include at least one of esters having a molecular weight of greater than about 250, mineral oils, alkylbenzene oils, among others. Preferred oils include at least one of cyclic mineral oils, polyalkylene glycol, polyol ester, aromatic oils such as alkylbenzene, among others. Such oils typically have boiling points greater than about 100° C., and a molecular weight greater than about 100.

The azeotropic or azeotrope-like mixtures of the invention may possess enhanced solubility within certain compounds in comparison to the hydrofluorocarbon component(s) of the azeotrope. Without wishing to be bound by any theory or explanation, it is believed that a hydrocarbon-containing azeotrope is relatively more soluble in oils such as mineral oil, alkylbenzene, polyalkylene glycol, polyol ester, among others. Such an increased solubility may enhance the oil circulation rate in refrigeration and air conditioning equipment, e.g., when used as an automotive refrigerant. Increased oil solubility is also desirable, when the inventive mixture is being introduced into previously used oil-containing equipment, wherein the existing oil is substantially insoluble with a HFC refrigerant. For example, when retrofitting a refrigeration system, which contains CFC-12 and an alkylbenzene oil, with a HFC-based refrigerant, the system is normally flushed to remove the undesired refrigerant. However, residual amounts of alkylbenzene oil may remain in the system. The presence of a hydrocarbon such as 2-methylbutane can enhance the solubility (lowers the critical solution temperature) of the residual alkylbenzene oil within a HFC-based refrigerant, e.g., HFC-134a or HFC-134.

While particular emphasis has been placed upon mixtures consisting essentially of binary or ternary azeotropic or azeotrope-like compositions, the scope of this invention includes an azeotrope consisting essentially of a single hydrocarbon compound added to a single fluorinated molecule, as well as a single hydrocarbon added to mixtures of two or more fluorinated molecules. In some cases such a mixture of two or more fluorinated molecules may be an azeotropic or azeotrope-like mixture which in turn forms an azeotrope with the hydrocarbon. Further, the invention includes mixtures which consist essentially of one or more hydrocarbons added to a single fluorinated molecule, as well as mixtures of one or more hydrocarbons mixtures of one or more fluorinated molecules. In all of the above cases, at least one additional hydrocarbon and/or fluorinated molecule may be a component of the mixture.

Specific examples illustrating the invention are given below. Unless otherwise stated therein, all percentages are by weight. It is to be understood that these examples are merely illustrative and in no way are to be interpreted as limiting the scope of the invention. All values given in the Examples are +/−5 percent.

EXAMPLE 1

The Bubble Points of mixtures containing HFC-134a, HFC-134, HFC-23, and the Bubble Point of a mixture consisting essentially of HFC-236fa with n-pentane were measured. A steel bomb fitted with a pressure transducer was evacuated and weighed. The first refrigerant component was added to the bomb. The bomb and refrigerant were frozen in liquid nitrogen, and a vacuum was pulled to remove non-condensible gases. The bomb and refrigerant were weighed again. A second refrigerant component was added to the bomb. The bomb and refrigerants were frozen, evacuated and weighed again.

The previous weight measurements were used to determine the liquid mixture composition. The bomb was then placed in a constant temperature bath, and the pressure was monitored until it stabilized e.g., at least one hour. Equilibrated pressure or bubble point was measured as a function of mixture composition at about 10 wt. % intervals. Other compositions were tested by adding, degassing and weighing additional amounts of either component. The pressure-liquid composition curve was fitted with an equation of state and the bubble point curve or plot was drawn.

For HFC-236fa/cyclopentane, and the mixtures containing HFC-236ea, the Bubble Point is calculated by using computer modeling.

After calculating or measuring the Bubble Point of a mixture, the Dew Point is determined by using computer modeling. The Dew Point for the mixtures is also plotted. The area defined by overlapping Bubble Point and Dew Point plots corresponds substantially to the azeotropic and azeotrope-like compositions of the mixture at a given temperature.

Figure 2:
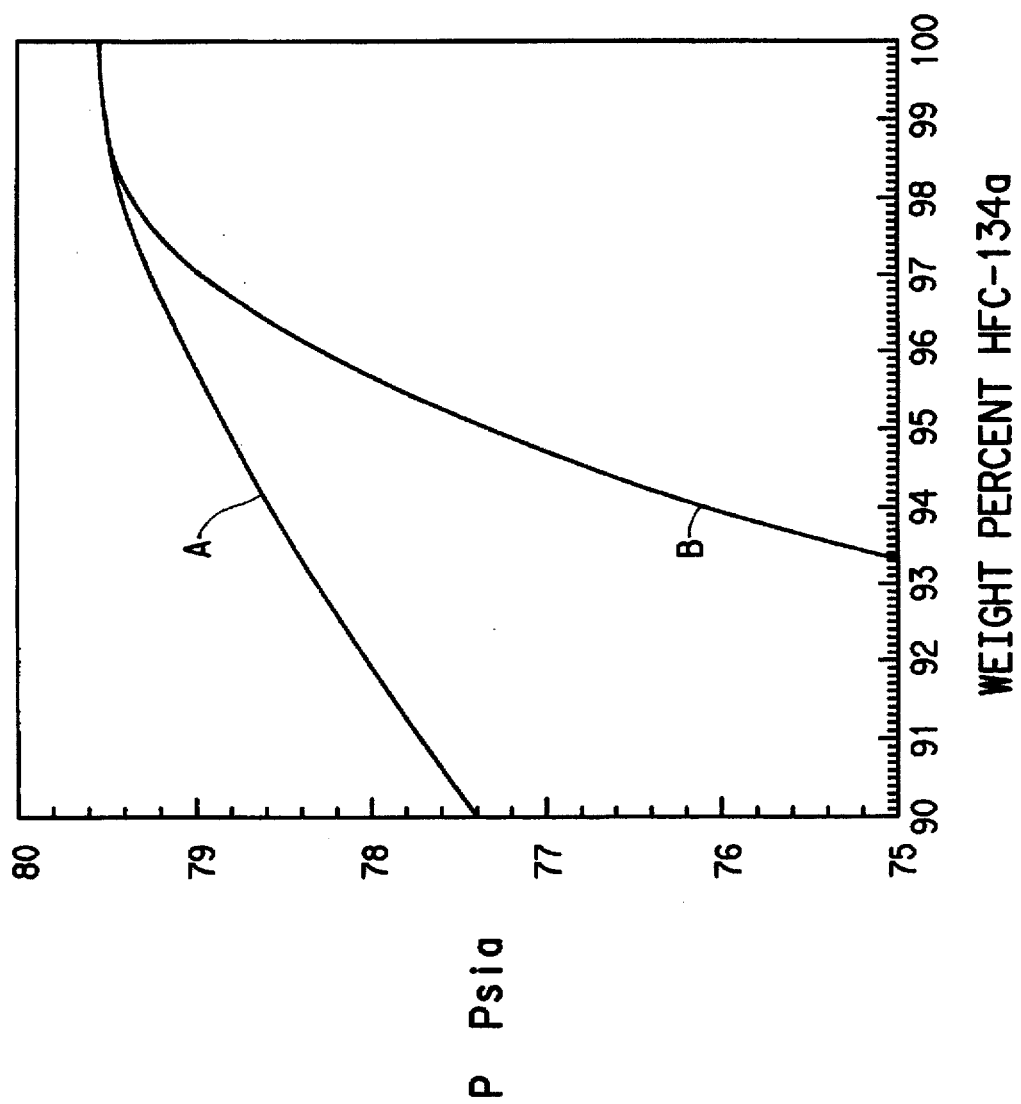
FIG. 2 is an expanded graphical representation of a portion of FIG. 1.

Referring now to FIGS. 1 and 2, FIGS. 1 and 2 graphically represent the vapor pressures (psia) for a mixture consisting essentially of 0 to 100 wt. % HFC-134a/2-methylbutane at a temperature of about 18.7 degrees C. Plot "A" corresponds to the Bubble Point and Plot "B" corresponds to the Dew Point. The area substantially defined by the overlapping portions of Plots "A" and "B", which is shown in greater detail in FIG. 2, shows the azeotropic and azeotrope-like mixtures.

Figure 3:
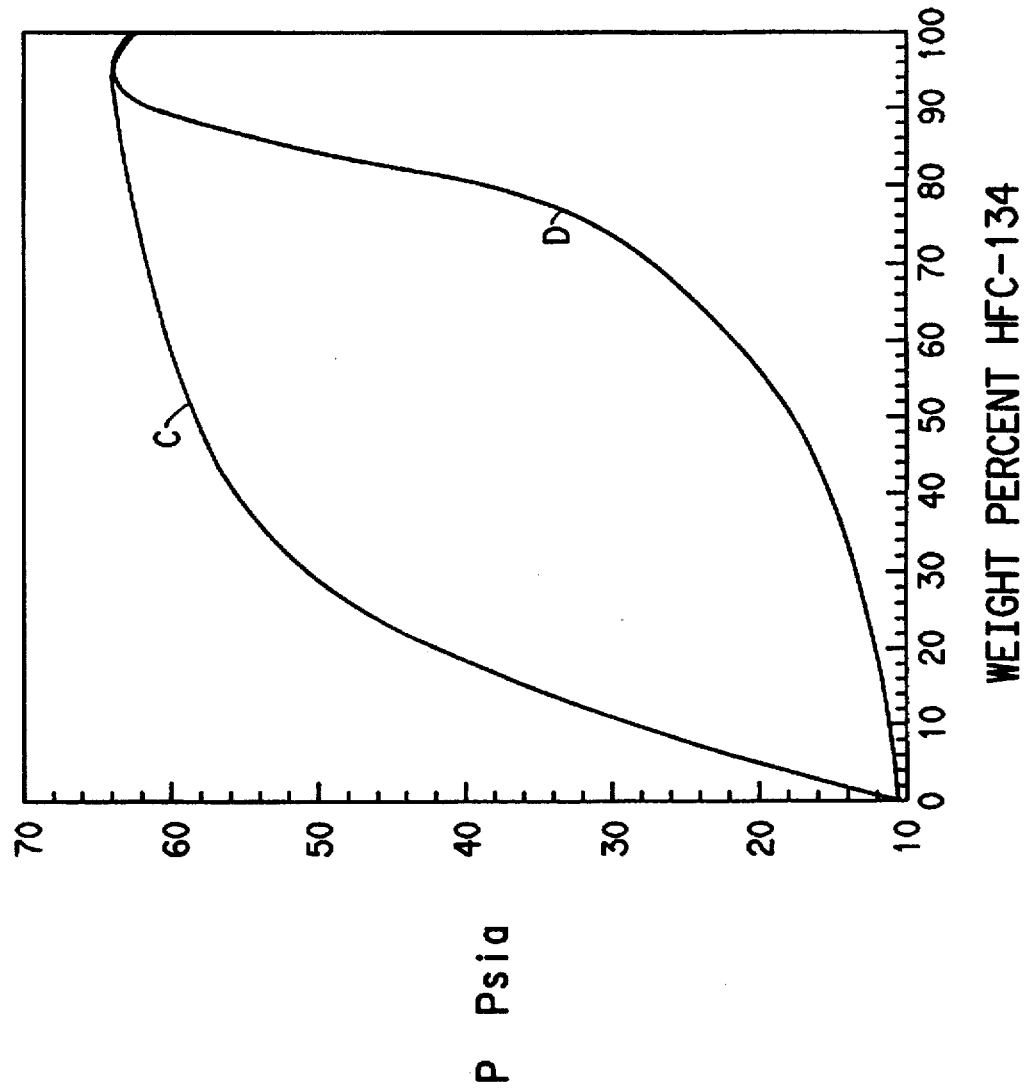
FIG. 3 is a graphical representation of the vapor pressure for a 0 to 100 wt. % mixture consisting essentially of HFC-134/2-methylbutane.
Figure 4:
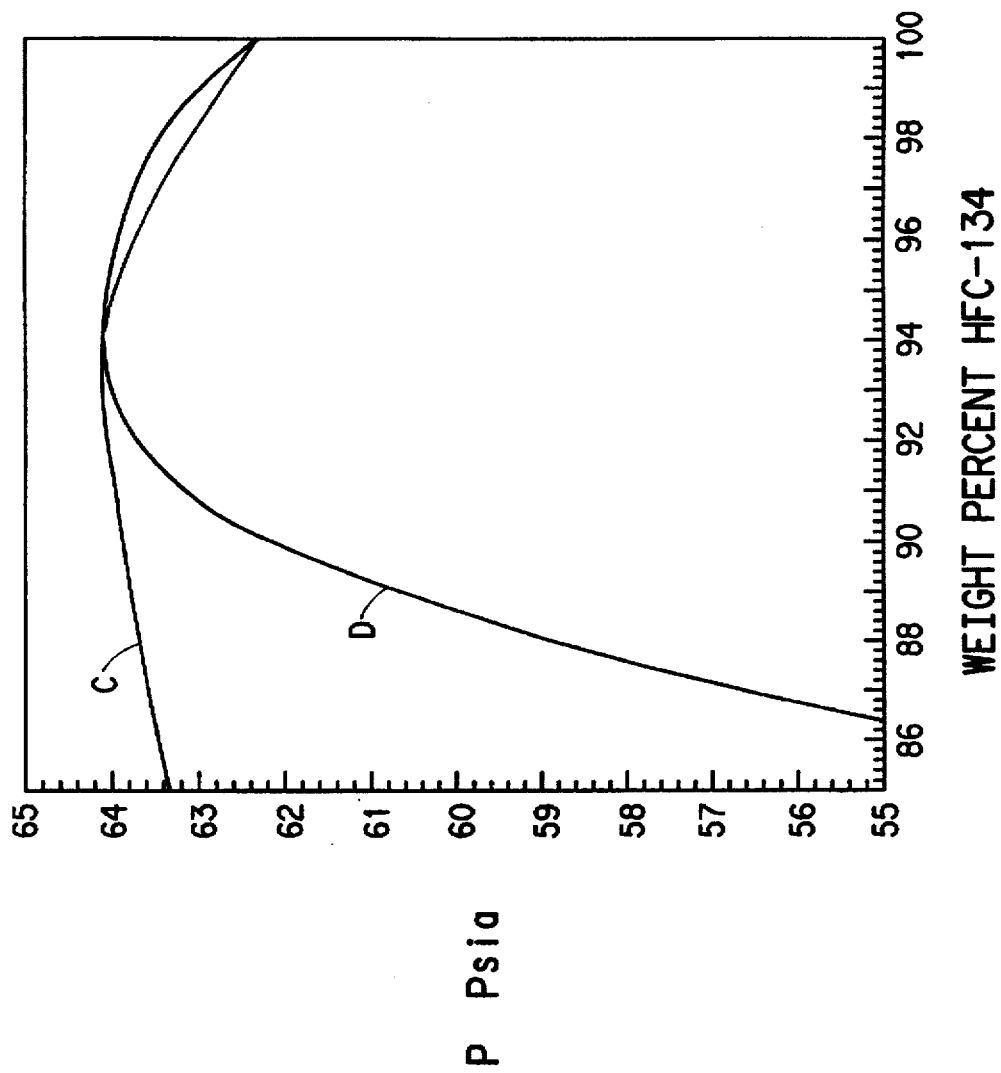
FIG. 4 is an expanded graphical representation of a portion of FIG. 3.

Referring now to FIGS. 3 and 4, FIGS. 3 and 4 graphically represent the vapor pressures (psia) for a mixture consisting essentially of 0 to 100 wt. % HFC-134/isopentane or 2-methylbutane at a temperature of about 18.65 degrees C. Plot "C" corresponds to the Bubble Point and Plot "D" corresponds to the Dew Point. The overlapping portions of Plots "C" and "D", i.e., the azeotropic and azeotrope-like mixtures, are shown in greater detail in FIG. 4.

Figure 5:
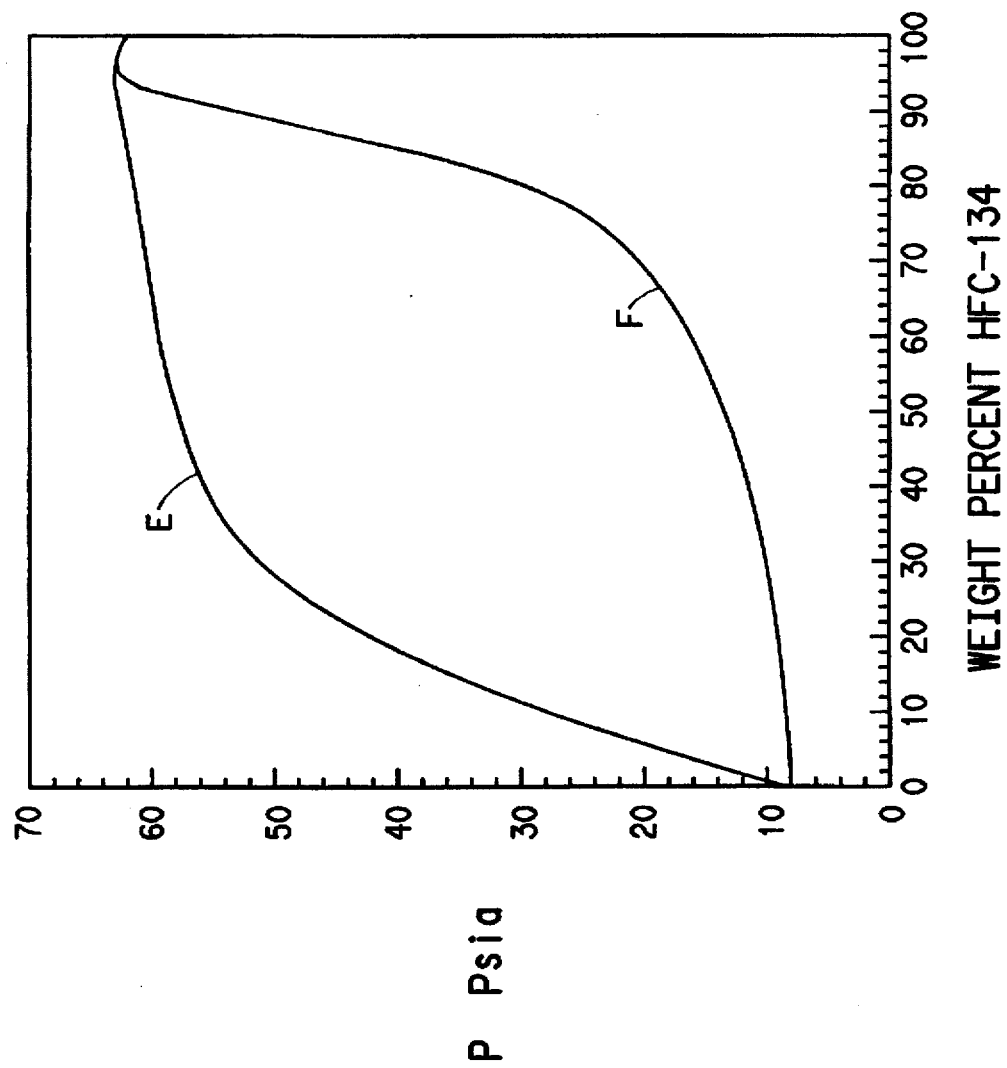
FIG. 5 is a graphical representation of the vapor pressure for a 0 to 100 wt. % mixture consisting essentially of HFC-134/normal or n-pentane.
Figure 6:
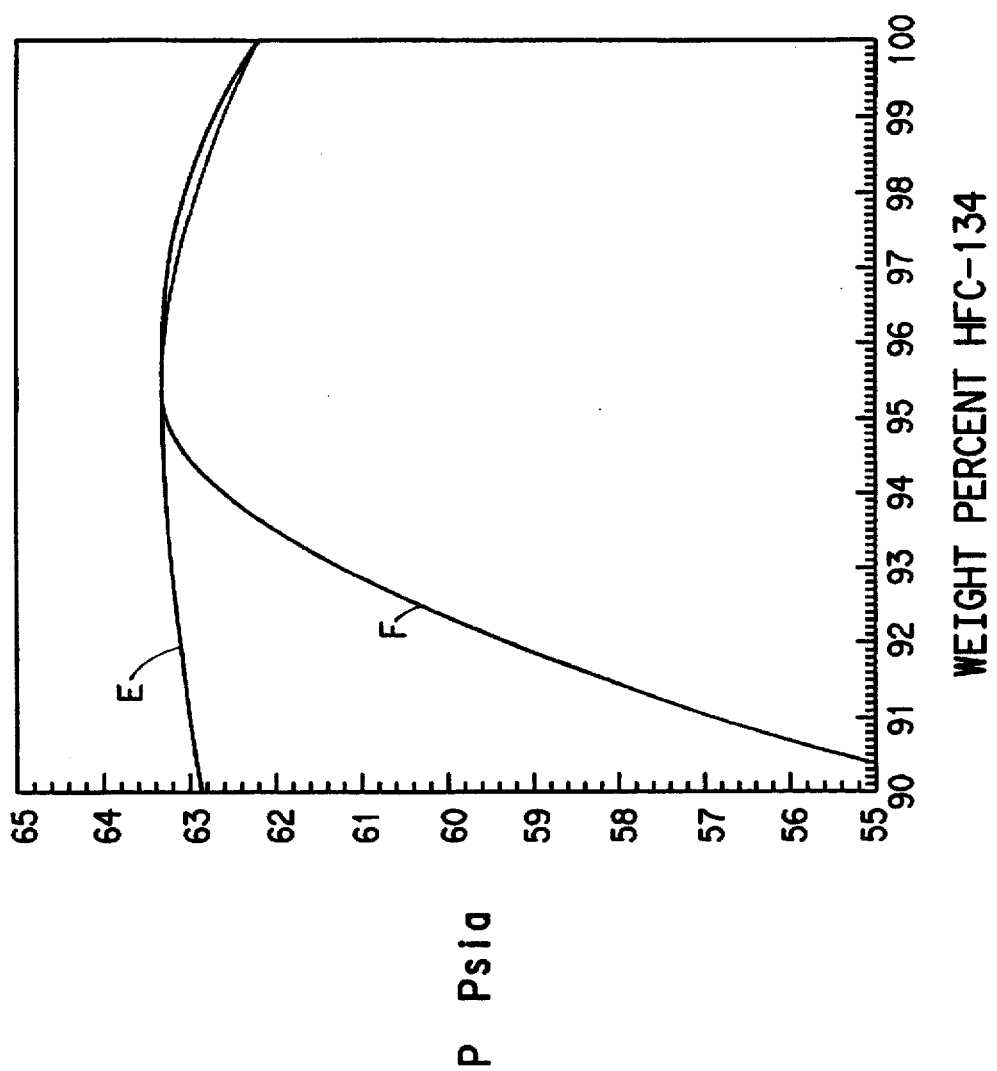
FIG. 6 is an expanded graphical representation of a portion of FIG. 5.

Referring now to FIGS. 5 and 6, FIGS. 5 and 6 graphically represent the vapor pressures (psia) for a mixture consisting essentially of 0 to 100 wt. % HFC-134/normal or n-pentane at a temperature of about 18.6° C. Plot "E" corresponds to the Bubble Point and Plot "F" corresponds to the Dew Point. The overlapping portions of Plots "E" and "F", i.e., the azeotropic and azeotrope-like mixtures, are shown in greater detail in FIG. 6.

Figure 7:
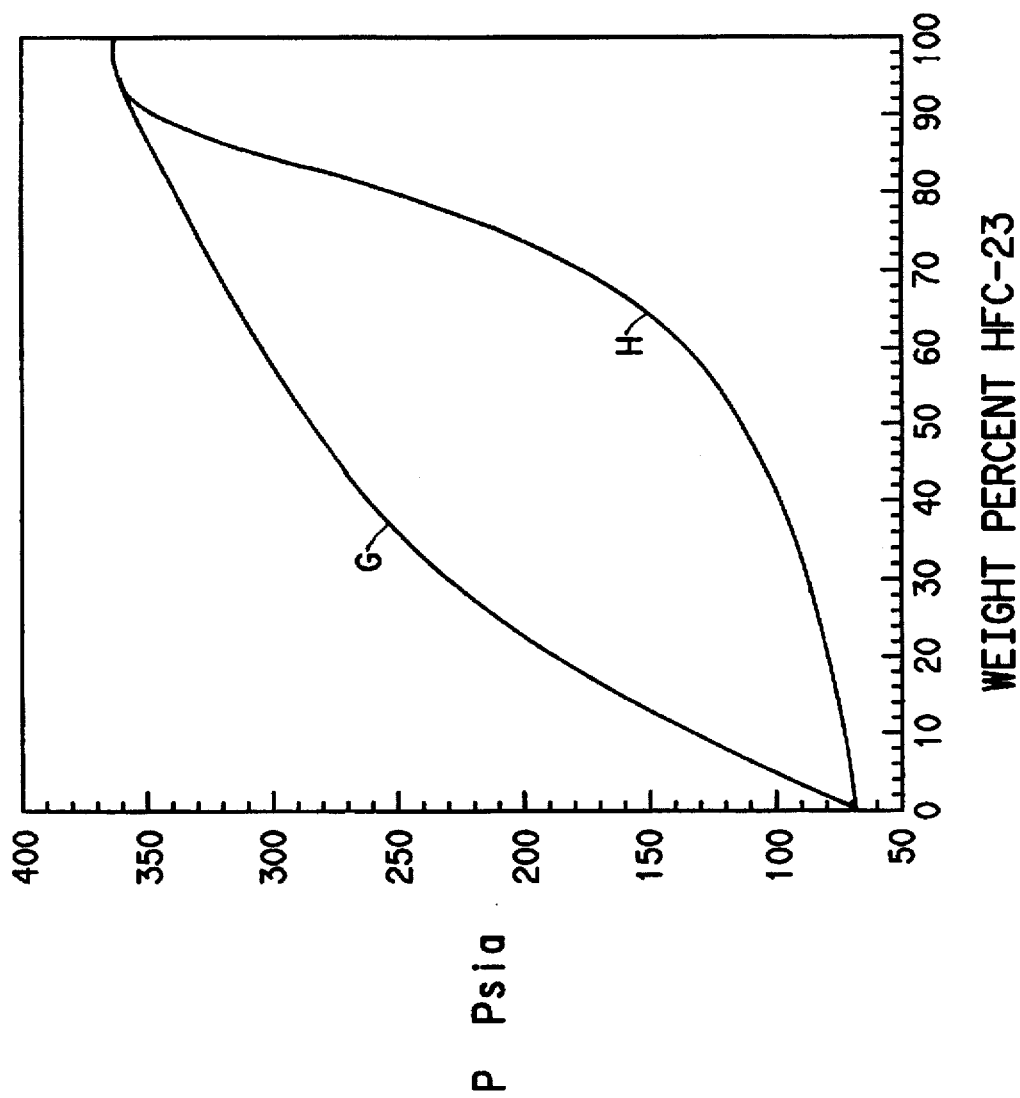
FIG. 7 is a graphical representation of the vapor pressure for a 0 to 100 wt. % mixture consisting essentially of HFC-23/propane.
Figure 8:
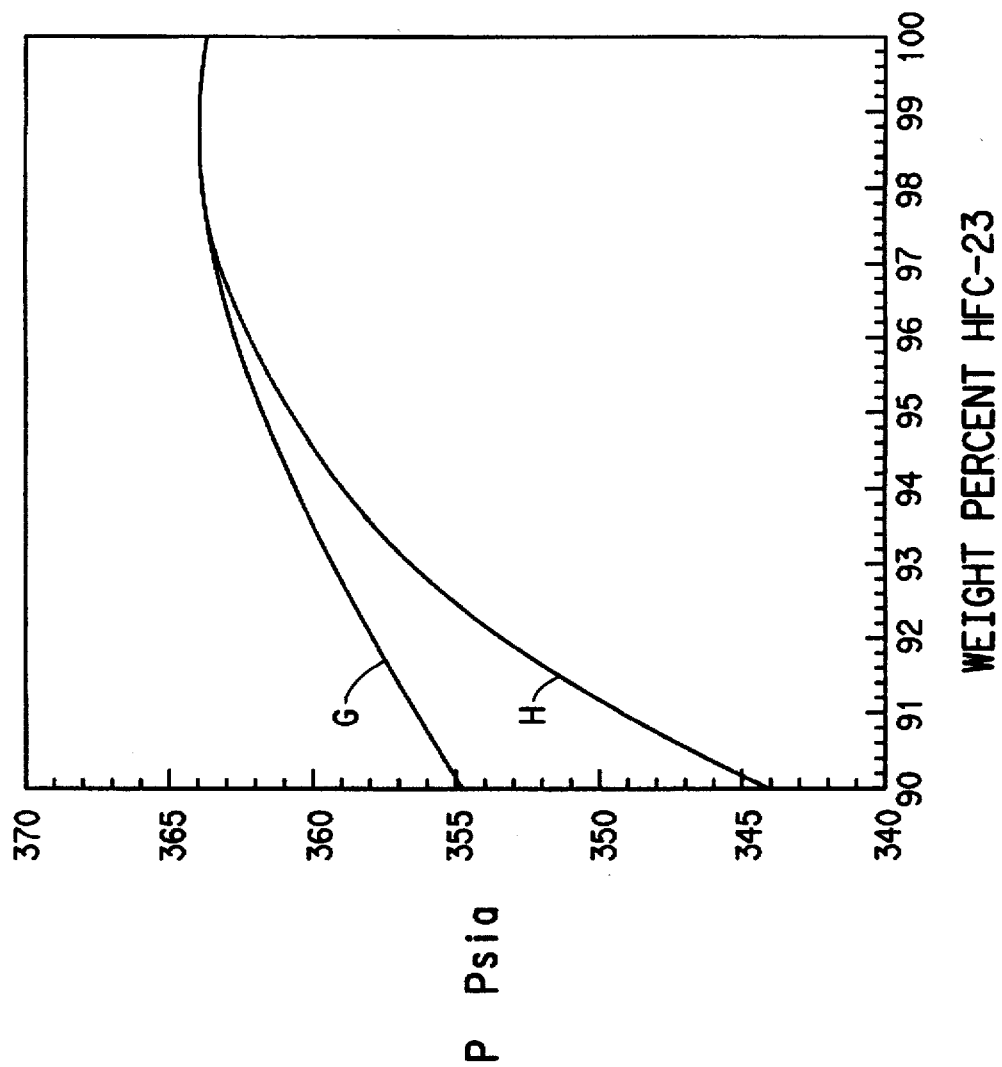
FIG. 8 is an expanded graphical representation of a portion of FIG. 7.

Referring now to FIGS. 7 and 8, FIGS. 7 and 8 graphically represent the vapor pressure (psia) for a mixture consisting essentially of 0 to 100 wt. % HFC-23/propane at a temperature of about 0 degrees C. Plot "G" corresponds to the Bubble Point and Plot "H" corresponds to the Dew Point. The overlapping portions of Plots "G" and "H", i.e., the azeotropic and azeotrope-like mixtures, are shown in greater detail in FIG. 8.

Figure 9:
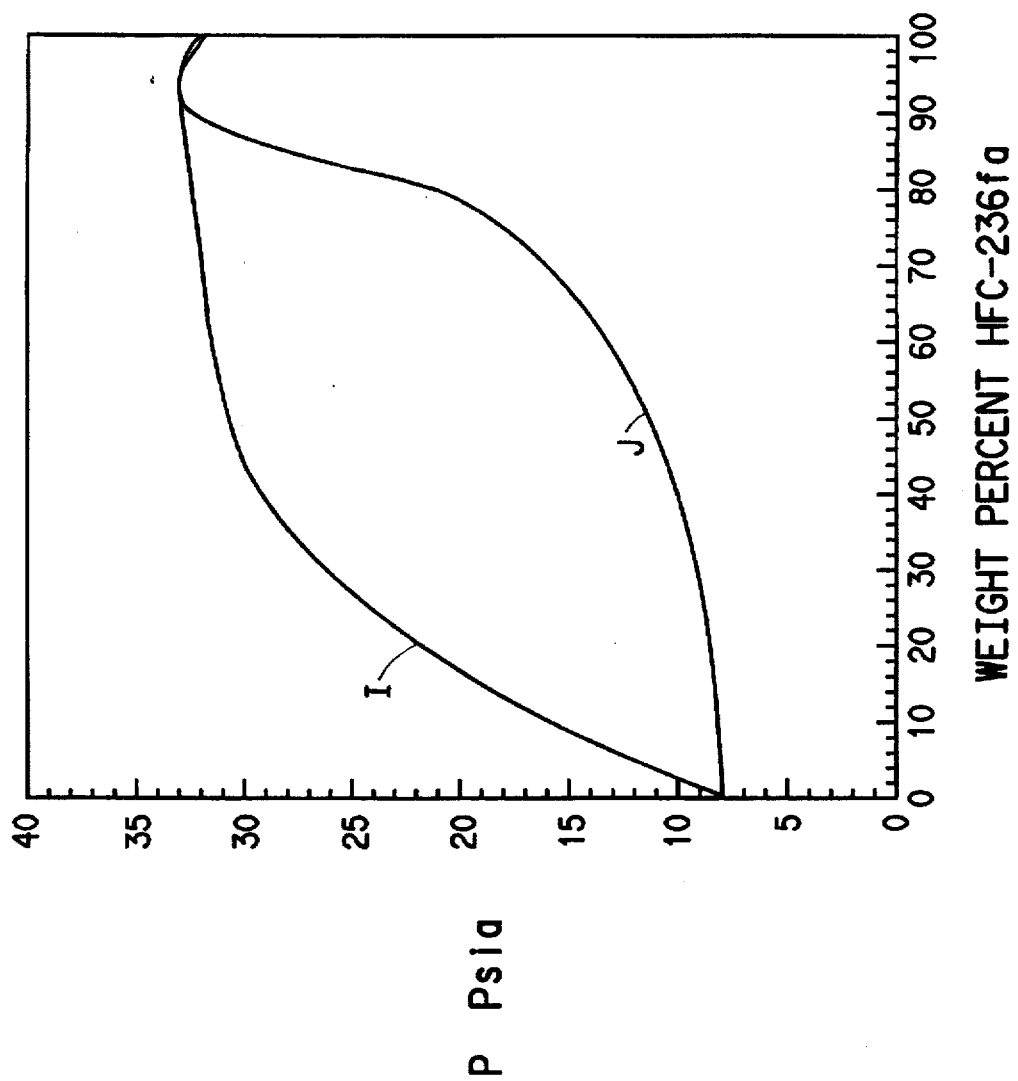
FIG. 9 is a graphical representation of the vapor pressure for a 0 to 100 wt. % mixture consisting essentially of HFC-236fa/n or normal pentane.
Figure 10:
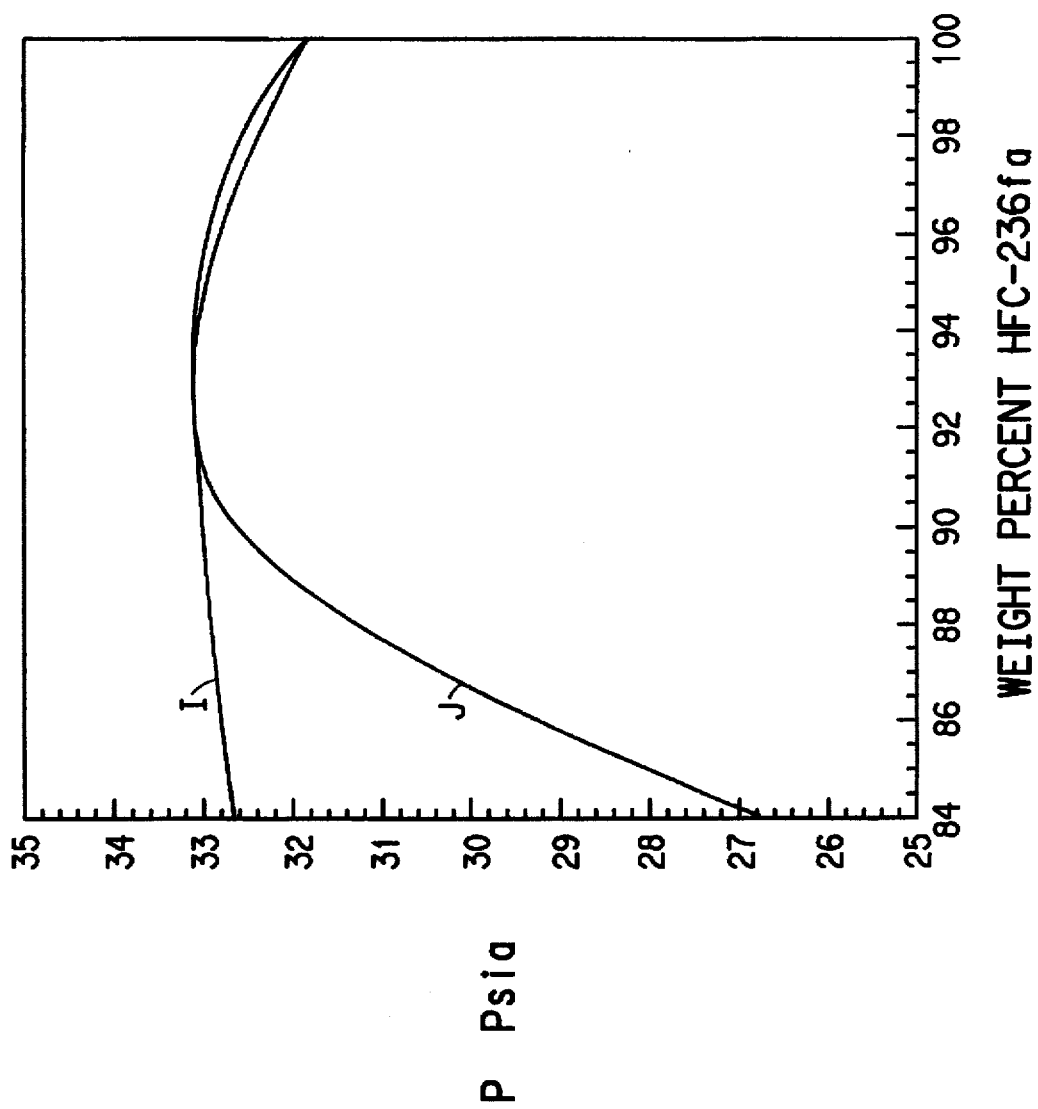
FIG. 10 is an expanded graphical representation of a portion of FIG. 9.

Referring now to FIGS. 9 and 10, FIGS. 9 and 10 graphically represent the vapor pressure (psia) for a mixture consisting essentially of 0 to 100 wt. % HFC-236fa/normal or n-pentane at a temperature of about 18.8 degrees C. Plot "I" corresponds to the Bubble Point and Plot "J" corresponds to the Dew Point. The overlapping portions of Plots "I" and "J", i.e., the azeotropic and azeotrope-like mixtures, are shown in greater detail in FIG. 10.

Figure 11:
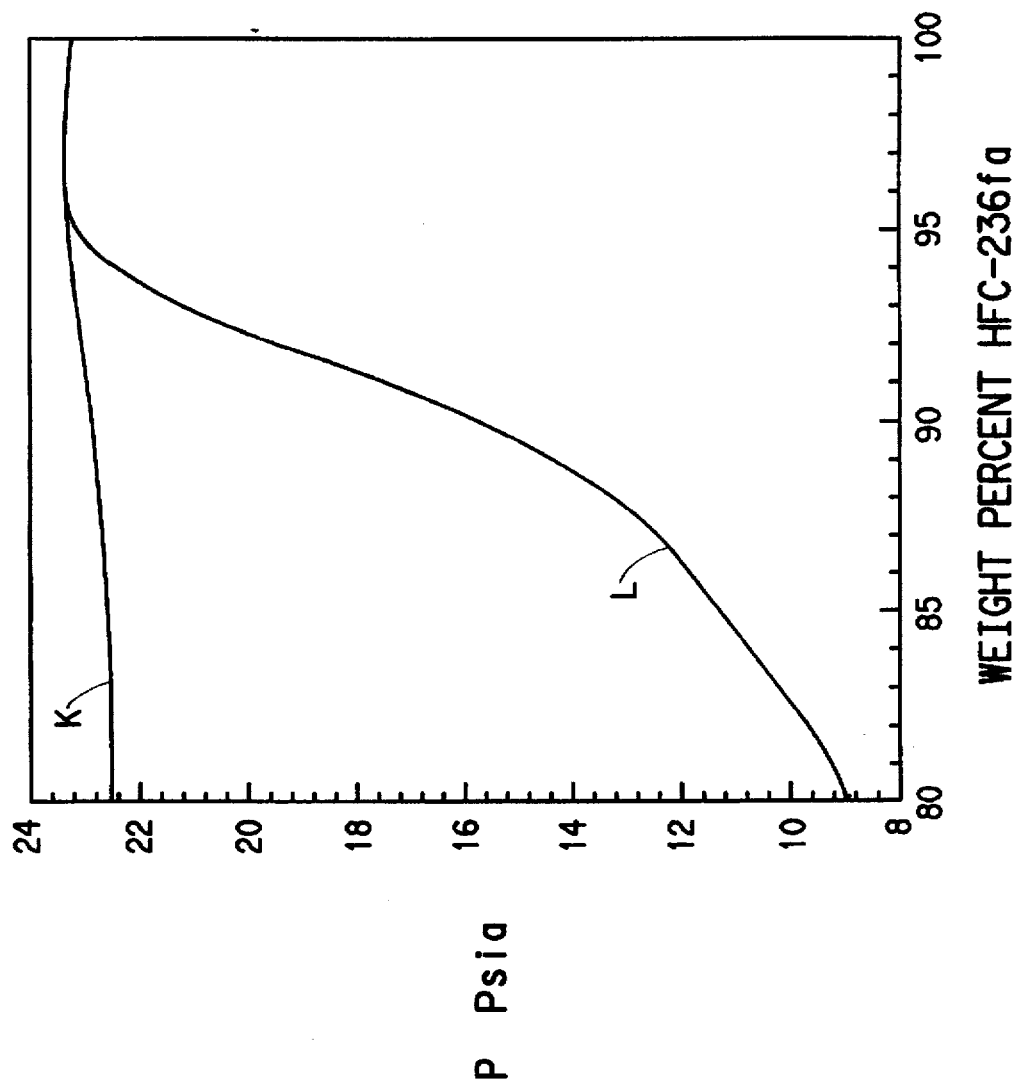
FIG. 11 is a graphical representation of the vapor pressure for a 80 to 100 wt. % mixture consisting essentially of HFC-236fa/cyclopentane.

Referring now to FIG. 11, FIG. 11 graphically represents the vapor pressure (psia) for a mixture consisting essentially of 80 to 100 wt. % HFC-236fa/cyclopentane at a temperature of about 10 degrees C. Plot "K" corresponds to the Bubble Point and Plot "L" corresponds to the Dew Point. The overlapping portions of Plots "K" and "L" represent the azeotropic and azeotrope-like mixtures.

Referring now to FIG. 12, FIG. 12 graphically represents the vapor pressure (psia) for a mixture consisting essentially of 80 to 100 wt. % HFC-236ea/cyclopentane at a temperature of about 10° C. Plot "M" corresponds to the Bubble Point and Plot "N" corresponds to the Dew Point. The overlapping portions of Plots "M" and "N" represent the azeotropic and azeotrope-like mixtures.

EXAMPLE 2

HFC-134, HFC-134a, and mixtures thereof with isopentane were tested for efficiency and capacity in a calorimeter. The calorimeter was employed for providing a simulated refrigeration load to a compressor in order to generate data that was used to analyze the efficiency and capacity of the compressor. HFC-134a and an azeotrope-like composition of HFC-134a and 2-methylbutane were tested using a commercially available Matsushita D128LGAA compressor.

The calorimeter test was performed substantially in accordance with ASHRAE Standard Test No. 23–78. When testing the inventive refrigerants, condenser temperatures of 110° F., 120° F., and 130° F. and evaporator temperatures of −20° F., −10° F., and 0° F., were used. Such temperatures correspond to those typically employed in residential refrigerator/freezer systems.

A. Refrigerant Performance

The following Table shows the experimental performance of the inventive refrigerants. The data were obtained using the following conditions.

Evaporator Temperature −20° F. (−28.9° C.)
Condenser Temperature 110° F. (43° C.)
Subcool Temperature 90° F. (32.2° C.)

Return Gas Temperature 90° F. (32.2° C.)
Compressor Efficiency ranged between 50 and 75%.

| Refrig. Comp. | Evap. Press. psig. (kPa) | Cond. Press. psig (kPa) | Compr. Dis. Temp. °F. (°C.) | COP | Capacity Btu/hr (W) |
|---|---|---|---|---|---|
| HFC-134a | −1.8 (89.1) | 147 (1120) | 129 (53.9) | 1.24 | 615 (180) |
| HFC-134a/2-methylbutane 98.3/1.7 | −1.7 (89.5) | 147 (1110) | 127 (52.7) | 1.26 | 630 (185) |
| HFC-134 | −5.3 (65.1) | 115 (894) | 130 (54.5) | 1.14 | 550 (161) |
| HFC-134/2-methylbutane 98.8/1.2 | −4.9 (67.5) | 115 (896) | 133 (56.1) | 1.14 | 560 (164) |

B. Refrigerant Performance

The following table shows the performance of the inventive refrigerants. The data is based on the following conditions:

Evaporator temperature 45.0° F. (7.2° C.)
Condenser temperature 130.0° F. (54.4° C.)
Subcool temperature 115.0° F. (46.1° C.)
Return gas temperature 65.0° F. (18.3° C.)
Compressor efficiency is 75% been removed, at which time the vapor pressure of the composition remaining in the vessel is measured.

The following Table illustrates the impact of vapor leakage by using an additional fluorine-containing molecule and hydrocarbon to maintain a non-flammable liquid composition. The data listed in the following Table is measured at a temperature of about 15.6° C.

| Refrig comp | Evap press (psia/kPa) | Cond press (psia/kPa) | Comp Dis Temp (F/C) | COP | Capacity but/min (kw) |
|---|---|---|---|---|---|
| 134/n-pentane | | | | | |
| 100/0.0 | 42.2 (290.9) | 172.5 (1189.2) | 174.2 (79.0) | 3.793 | 201.3 (3.54) |
| 98.2/1.8 | 45.0 (310.2) | 169.4 (1167.8) | 166.2 (74.6) | 3.978 | 209.9 (3.69) |
| 23/propane | | | | | |
| 100/0.0 | 440.5 (3037) | 1271.4 (8765) | 213.2 (100.7) | 1.760 | 803.9 (14.12) |
| 98.2/1.8 | 439.7 (3031) | 1197.4 (8255) | 203.5 (95.3) | 1.722 | 732.9 (12.88) |
| 236fa/n-pentane | | | | | |
| 100/0.0 | 20.9 (144.1) | 95.0 (654.9) | 143.1 (61.7) | 3.763 | 103.8 (1.82) |
| 93.0/7.0 | 21.9 (151.0) | 96.3 (663.9) | 142.0 (61.1) | 3.743 | 105.7 (1.86) |
| 236ea/cyclopentane | | | | | |
| 100/0.0 | 16.3 (112.4) | 78.8 (543.2) | 144.5 (62.5) | 3.791 | 86.3 (1.52) |
| 95.0/5.0 | 17.0 (117.2) | 79.2 (545.9) | 146.1 (63.4) | 3.800 | 87.7 (1.54) |

EXAMPLE 3

Impact of Vapor Leakage on Vapor Pressure at 15.6° C.

A vessel is charged with an initial composition at 15.6° C., and the vapor pressure (psia) of the composition is measured. The composition is allowed to leak from the vessel, while the temperature is maintained at about 15.6° C., until a specified weight percent of the initial composition has

| HFC | HC | Initial | | | After 50% | | | After 95% vaporleak | | |
|---|---|---|---|---|---|---|---|---|---|---|
| | | press | liq | vap | press | liq | vap | press | liq | vap |
| 134a | | 72.0 | 98.0 | 98.2 | 72.0 | 97.8 | 98.1 | 71.9 | 96.7 | 97.3 |
| | 2-mb* | | 2.0 | 1.8 | | 2.2 | 1.9 | | 3.3 | 2.7 |
| 134a | | 65.3 | 49.0 | 53.9 | 64.7 | 45.5 | 50.5 | 62.4 | 31.9 | 36.9 |
| 134 | | | 49.0 | 43.8 | | 52.7 | 47.4 | | 67.2 | 61.9 |
| | 2-mb | | 2.0 | 2.2 | | 1.8 | 2.1 | | 0.9 | 1.3 |

|  |  | Initial |  |  | After 50% |  |  | After 95% vaporleak |  |
|---|---|---|---|---|---|---|---|---|---|
| HFC | HC | press | liq | vap | press | liq | vap | press | liq | vap |
| 134a |  | 73.5 | 98.0 | 97.2 | 72.9 | 98.4 | 98.0 | 72.2 | 98.7 | 98.7 |
|  | 2-mb |  | 1.0 | 0.9 |  | 1.1 | 1.0 |  | 1.3 | 1.2 |
|  | nC4** |  | 1.0 | 1.9 |  | 0.5 | 1.0 |  | 0.03 | 0.1 |

*2-methyl butane
**normal butane

The above Table demonstrates that for 134a/2-methylbutane mixture the liquid concentration of hydrocarbon increases to about 3.3 wt. % (about the flammable limit) after a 95% leak. Addition of the third component, however, makes the vapor relatively more concentrated in hydrocarbon such that the liquid after a 95% leak contains less hydrocarbon.

The above Table demonstrates that the presence of HFC-134 in a HFC-134a/2-methylbutane azeotrope-like mixture causes an increase in the percentage of hydrocarbon in a vapor leak thereby reducing the quantity of hydrocarbon that remains in the liquid refrigerant. The above Table also demonstrates that adding an additional hydrocarbon such as n-butane can be employed to decrease the percentage of hydrocarbon remaining in the liquid after a 95% vapor leak.

ety of Testing Materials Procedure No. ASTM-681-85 (100° C.). Leakage of up to about 50% of a vapor from the original composition yields a substantially nonflammable refrigerant because the remaining composition has only about 0.1% more isobutane than the original composition the composition of HFC-32 has decreased by 2.7%, and the composition of HFC-125 has increased by almost 2.5%:

T = 26.667 C.

|  |  | Initial |  |  | After 50% |  |  | After 95% vaporleak |  |
|---|---|---|---|---|---|---|---|---|---|
| HFC | HC | press | liq | vap | press | liq | vap | press | liq | vap |
| 32 |  | 231.6 | 28.0 | 31.4 | 229.8 | 25.3 | 28.7 | 232.1 | 16.5 | 19.3 |
| 125 |  |  | 70.0 | 66.7 |  | 72.5 | 69.3 |  | 80.7 | 78.2 |
|  | iC4 |  | 2.0 | 1.9 |  | 2.1 | 2.0 |  | 2.8 | 2.5 | iC4-isobutane

EXAMPLE 4

Impact of Vapor Leakage at 26.7° C.

A ternary refrigerant mixture consists essentially of HFC-32, HFC-125 and isobutane in the respective proportions of 28, 70 and 2 wt. %. This mixture has the advantages that it is neither flammable, nor will it become so after about 50% of it has leaked because the original mixture is substantially nonflammable and is azeotrope-like with respect to the hydrocarbon.

A vessel is charged with an initial composition at 26.67° C., and the composition is allowed to leak from the vessel substantially as described in Example 4.

The following Table illustrate the impact of vapor leakage. The data listed in the following Table is measured at about 26.67° C.

Up to about 4 wt. % of isobutane can be added to 32/125 (about 30/70 wt. %) without becoming flammable, was determined substantially in accordance with American Soci- While a few embodiments of the invention have been described above in detail one of ordinary skill in this art would recognize that other embodiments and variations are encompassed by the appended claims.

The following is claimed:

1. A non-flammable azeotrope or azeotrope-like composition consisting essentially of at least about 95% to about 99.9% by weight trifluoromethane and at least about 0.1% to less than about 5% by weight propane, wherein the vapor pressure of said composition is at least 363 psia at 0° C.

2. The composition of claim 1 wherein said composition further consist essentially of at least one additive selected from lubricants, oils, corrosion inhibitors, stabilizers, dyes, and mixtures thereof.

3. A method of refrigeration comprising condensing and evaporating the composition of claim 1.

4. A method of heat transfer comprising condensing and evaporating the composition of claim 1.

* * * * *